(12) United States Patent
Jensen

(10) Patent No.: US 8,782,912 B1
(45) Date of Patent: Jul. 22, 2014

(54) CIRCLE MAKING TOOL

(75) Inventor: Eric A. Jensen, Wasilla, AK (US)

(73) Assignee: Speedy Circle Manufacturing LLC, Palmer, AK (US)

( * ) Notice: Subject to any disclaimer, the term of this patent is extended or adjusted under 35 U.S.C. 154(b) by 99 days.

(21) Appl. No.: 13/529,054

(22) Filed: Jun. 21, 2012

Related U.S. Application Data

(60) Provisional application No. 61/561,379, filed on Nov. 18, 2011.

(51) Int. Cl.
*B43L 9/04* (2006.01)
(52) U.S. Cl.
CPC ........................................ *B43L 9/045* (2013.01)
USPC .............................. 33/27.032; 33/484; 33/562
(58) Field of Classification Search
CPC ......... B43L 9/04; B43L 9/045; B43L 13/201; G01B 3/02; G01B 3/14
USPC ........ 33/27.02, 27.03, 27.032, 484, 485, 563, 33/759, 760
See application file for complete search history.

(56) References Cited

U.S. PATENT DOCUMENTS

| | | | | | |
|---|---|---|---|---|---|
| 824,299 | A | * | 6/1906 | Huey | 33/27.03 |
| D148,434 | S | * | 1/1948 | Owen, Jr. | 33/27.03 |
| 2,983,048 | A | * | 5/1961 | Keller | 33/27.03 |
| 3,378,927 | A | * | 4/1968 | Lowery | 33/27.03 |
| 3,791,036 | A | * | 2/1974 | Stober et al. | 33/27.03 |
| 5,735,052 | A | * | 4/1998 | Lin | 33/27.03 |
| 8,458,916 | B2 | * | 6/2013 | Aplin et al. | 33/27.032 |
| 2005/0155234 | A1 | * | 7/2005 | Xieh | 33/27.03 |
| 2007/0124950 | A1 | * | 6/2007 | Wirtz | 33/759 |
| 2008/0022545 | A1 | * | 1/2008 | Wirtz | 33/759 |
| 2010/0083514 | A1 | * | 4/2010 | Williams | 33/27.02 |
| 2012/0151787 | A1 | * | 6/2012 | Phillips | 33/484 |

* cited by examiner

*Primary Examiner* — G. Bradley Bennett
(74) *Attorney, Agent, or Firm* — Michael J. Tavella

(57) ABSTRACT

A tool for carpentry that when used with a nail, a pencil, and a tape measure can draw circles and arcs from a radius of 1 inch up to that of the length of the tape measure. It can also easily make circles or arcs with a radius of 2 inches up to 12 inches using pencil guide holes that are staggered down the length of the device at one eighth-inch intervals. The tool has two rare earth magnets that hold the tape measure to the tool during use. The magnets can be used also to hold a nail on the tool for storage purposes. In that way, a nail is always available when a circle is needed. For more convenience, one or more bubble levels can be added to the tool making the tool not only a circle tool but a torpedo level as well.

19 Claims, 6 Drawing Sheets

CIRCLE MAKING TOOL

CROSS REFERENCE TO RELATED APPLICATIONS

This application claims benefit of Provisional application 61/561,379 filed Nov. 18, 2011

STATEMENT REGARDING FEDERALLY SPONSORED RESEARCH AND DEVELOPMENT

Not Applicable

BACKGROUND OF THE INVENTION

1. Field of the Invention

This invention relates to circle making tools and particularly to circle making tools with solid bodies.

2. Description of the Prior Art

Craftsmen and artists have drawn circles for many purposes over the millennia. For the most part, circles are drawn using a compass. This is a device that has two legs that are joined at one end. One leg has a point of some type and the other has a marking instrument of some type. A user first opens the legs of the compass to the desired radius. The user then places the point at the center of where the circle is to be drawn and then moves the marking end around using the pointed end as an axle. In this way, circles and arcs can readily be drawn. One key problem with compasses is that they are limited to the ability of the compass to be opened. Another problem is that compasses may drift from their original setting, which makes drawing accurate circles more difficult. Finally, many compasses have no markings designating the size of the circle. That means a user must place the compass legs against a ruler or other measuring device. That may lead to measurement errors.

Some solutions for drawing large circles involve using a string tied to a nail at one end and to a pencil at the other. Users can simply stretch the string and draw a circle. Obviously, drawing accurate circles using this method is difficult. Not only is their the problem of accurately measuring the proper string length, the string may stretch or shrink during the drawing, which leads to measurement errors.

Some craftsman use a steel measuring tape by anchoring the tip with a nail and placing a pencil at the proper radius and then swinging the tape measure around the pivot point. This method too is prone to errors in the exact placement of the center, and the proper placement of the pencil.

BRIEF DESCRIPTION OF THE INVENTION

The instant invention overcomes these difficulties. It is a tool for carpentry that can draw circles and arcs from a radius of 2 inches up to 12 inches using pencil guide holes that are staggered down the length of the device at one eighth-inch intervals.

To use the invention the tool is first secured at the center of the desired circle with a nail. Then the appropriate guide hole on the tool is selected based on desired size of circle or arc. A pencil is placed in the selected hole and the tool is moved across the surface of the material to be marked in a circular motion. For circles larger than the guide holes provided, a tape measure is secured to one protruding edge s on the tool nearest to the pivot point. The tape measure is extended to desired radius. A pencil is held on the edge of the tape and the tape and pencil are moved in a circular motion around the pivot point to make the desired circle or arc.

The tool has two rare earth magnets that hold the tape measure to the tool during use. The magnets can be used also to hold a nail on the tool for storage purposes. In that way, a nail is always available when a circle is needed.

For more convenience, one or more bubble levels can be added to the tool making the tool not only a circle tool but a torpedo level as well.

DETAILED DESCRIPTION OF THE INVENTION

Figure 1:
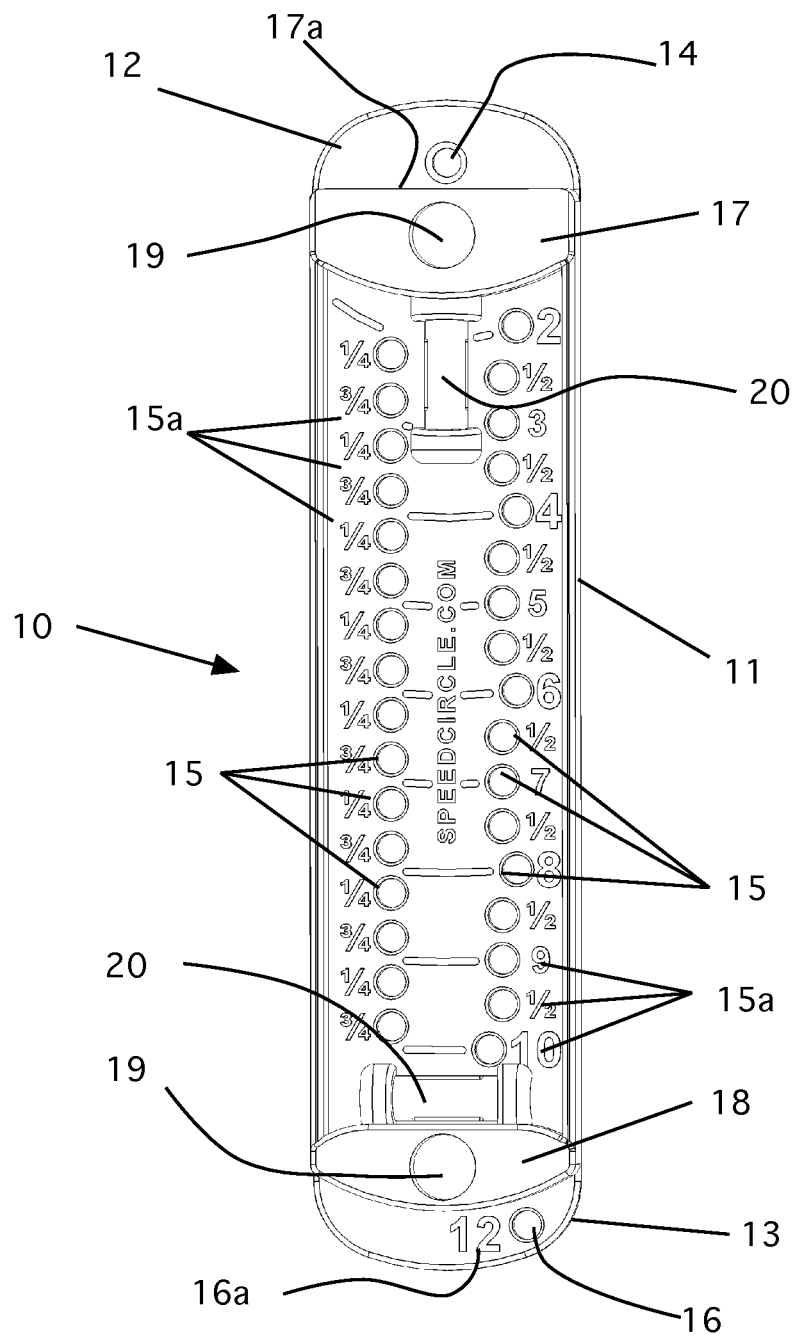
FIG. 1 is a top view of the invention.
Figure 2:
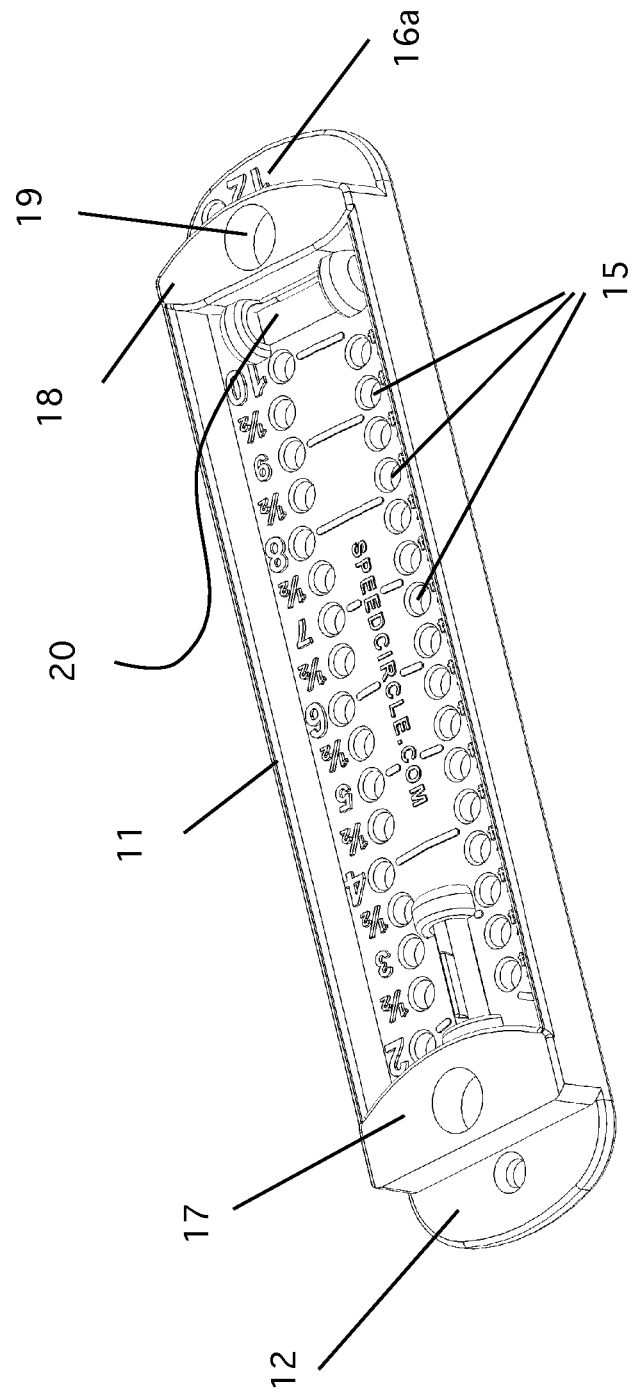
FIG. 2 is a top perspective view of the invention.

Referring now to FIGS. 1 and 2 a top view of the preferred embodiment of the invention 10 is shown. The tool has a center portion 11, a top end 12 and a bottom end 13. The top end 12 has a hole 14 formed in it to receive a nail. With the nail driven into a workpiece through the hole in the end 12, the tool is free to rotate about that nail (see, e.g., FIG. 6)

The center portion 11 has a number of holes 15 formed on both sides of the center portion as shown. These holes are for placement of a pencil. With a pencil (or other drawing instrument) in a selected hole, a circle of that radius may be drawn on a workpiece by moving the tool around the nail pivot until the circle is complete (again, see, FIG. 6). Arcs can also be drawn by stopping the tool at the desired place on the arc. In the preferred embodiment, the holes 15 are spaced apart in ¼-inch intervals, alternating on both sides. Note, too, that these holes 15 are marked with the proper measurements 15*a* to insure accurate circles.

As shown, the bottom end 13 has a hole 16 that is used to draw a 12-inch diameter circle (and a measurement designator 16*a*). There is a break between 10 inches and the 12-inch mark because of the lower raised form. Similarly, the smallest circle that can be drawn is a 2-inch diameter circle because of the upper raised form.

In the preferred embodiment, the tool is 6 inches long from the top hole 14 to the bottom hole 16. Note too that the markings are indicated in the diameter measurements to make using the tool easier.

As noted, there are two raised forms 17 and 18 at the ends as shown. These raised forms have high strength magnets 19 embedded in them. The raised forms and the magnets are used to hold the end of a tape measure. With the end of the tape measure secured in place, the size of circles can be expanded to twice the length of the tape measure. To make a circle with a tape measure, after securing the tool to the surface onto which the circle is to be drawn, place the end of the tape measure on the upper raised form 17 at end 17*a*. The magnets hold the end of the tape in place. Note that the raised form and magnets are both part of a means for temporarily securing a tape measure. Next, extend the tape measure to the desired radius of the circle and place a marking instrument beside it at that point (some tape measures have center holes that can be used if available). Then the pencil is moved around, using the tool as an anchor to draw the circle or arc.

Also in the preferred embodiment, two bubble levels 20, positioned orthogonally in the tool, are placed in the center portion 11 of the tool as shown. In this way, the tool can also be used as a 6-inch torpedo level, which increases the function of the tool.

FIG. 2 is a top perspective view of the invention. In this view, the raised forms 17 and 18 are shown. The hole 16 and label 16a is clearly shown as well.

Figure 3:
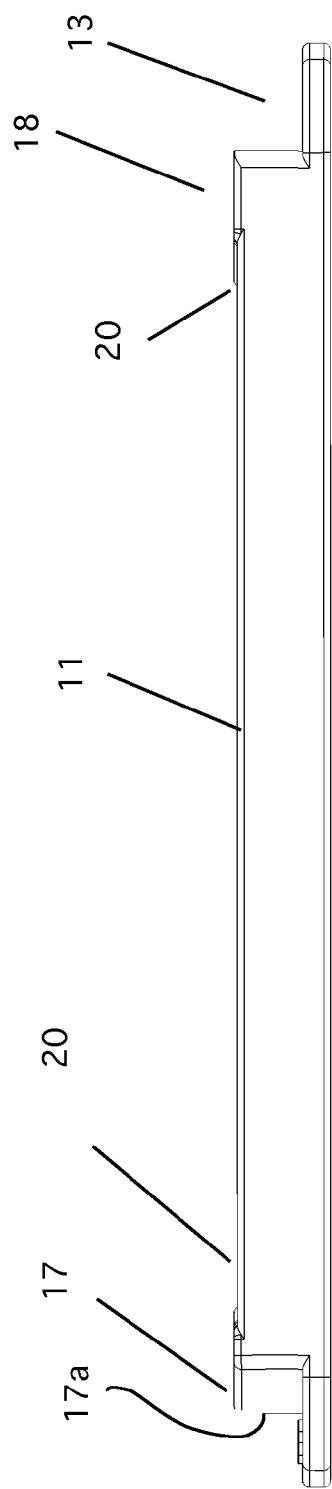
FIG. 3 is a side view of the invention.

FIG. 3 is a side view of the invention. Here, the raised forms 17 and 18 and the levels 20 are shown. Note that the flat end 17a of form 17 that is used to hold a tape measure is clearly shown as well.

Figure 4:
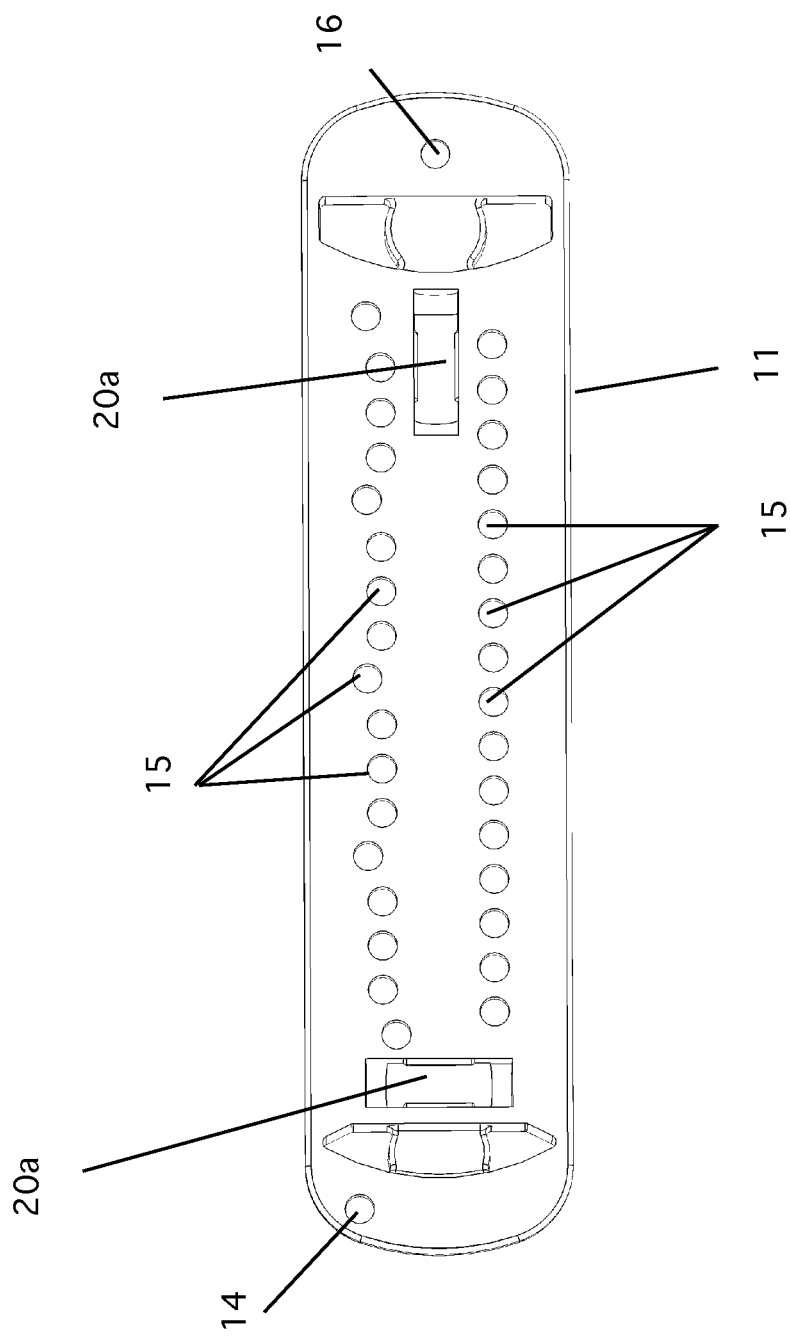
FIG. 4 is a bottom perspective view of the invention.

FIG. 4 is a bottom perspective view of the invention. In this view, the recesses 20a for the bubble levels are shown. Note that on one side of the tool, the holes 15 are staggered. This is done to offset the whole diameter points, such as 2, 3, 4 inches, etc. The ½ measurements are also offset—i.e., 3½, 4½, etc.

Figure 5:
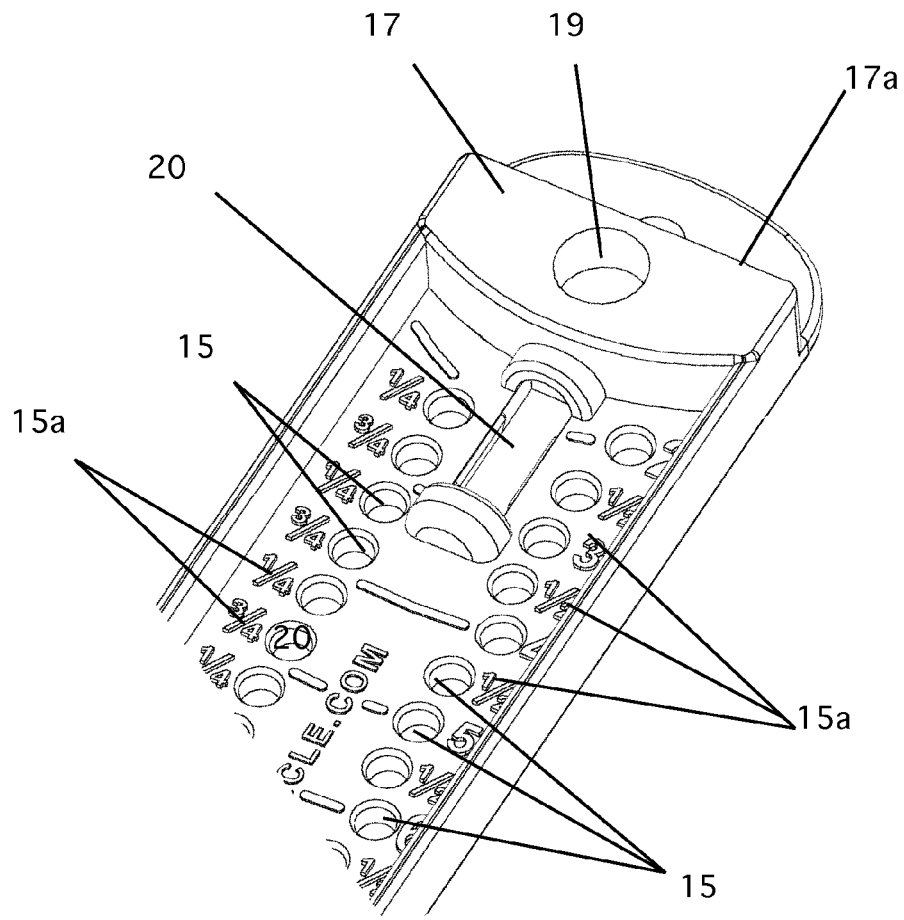
FIG. 5 is a detail view of one end of the invention.

FIG. 5 is an enlarged detail view of one end of the invention. In this view, one of the bubble levels 20 is shown. Also, the numbers 15a showing the circle sizes are clearly shown as well. Note that, as noted above, the pencil holes are alternated in one-quarter-inch segments.

Figure 6:
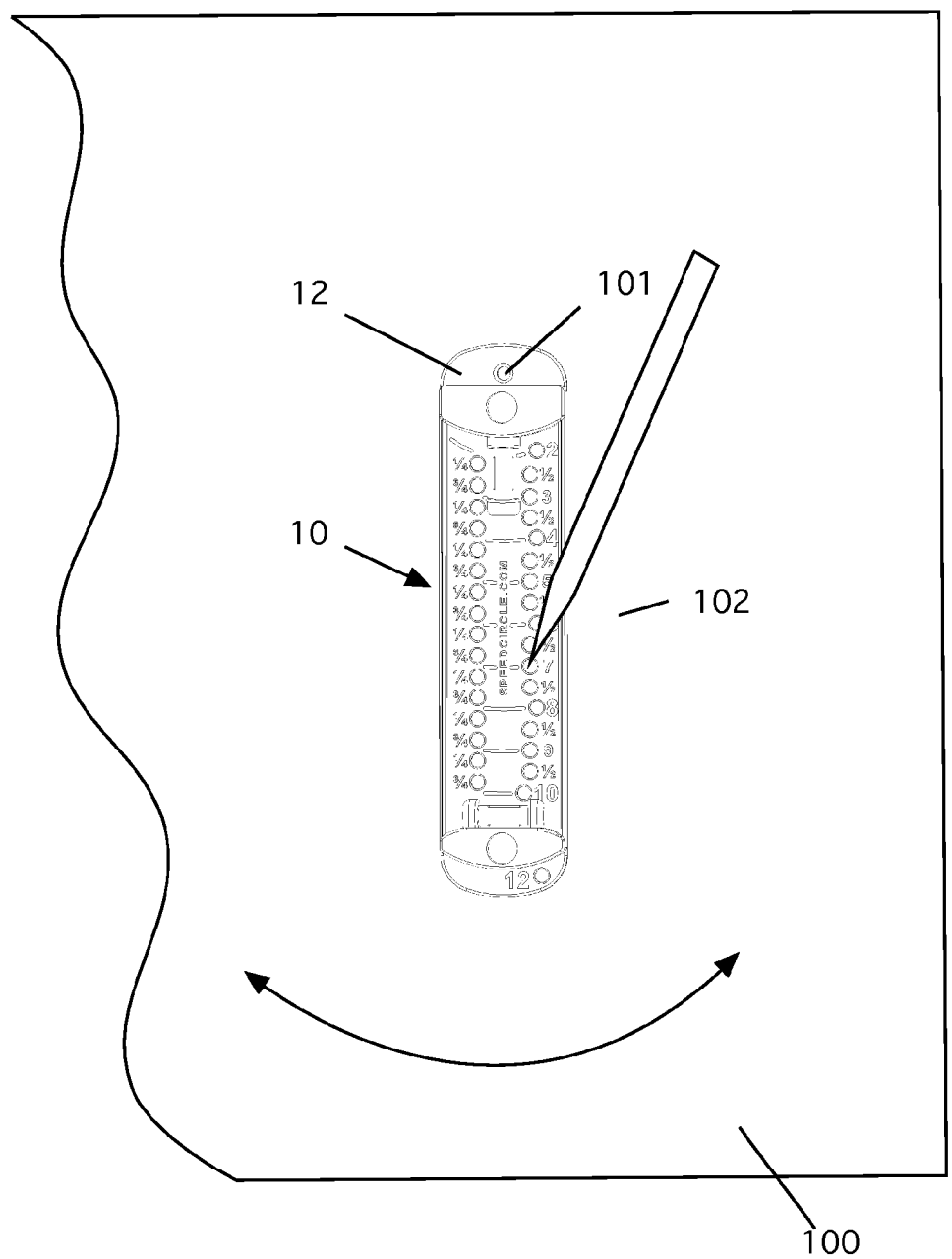
FIG. 6 is a detail of the device secured in place on a work piece to draw a circle.

FIG. 6 is a detail of the device secured in place on a workpiece to draw a circle. Here, the tool 10 is positioned on a work piece 100. A nail, or other common fastener, 101 is driven into the top hole 14 at end 12. Once secure, the tool is ready to use. A pencil 102 (or other marking instrument) is placed in the hole 16 and the tool is moved about the nail as shown by the arrows around until the desired arc or circle is formed.

The preferred embodiment is made of a molded plastic, with the bubble levels and magnets being added as part of the molding process. The device can be made in many colors, as desired.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A circle making tool comprising:
   a) an elongate form having two ends and a center portion, said center portion having a plurality of holes formed therein;
   b) a means for temporarily securing said elongate form to a workpiece being formed at one of said two ends of said elongate form; and
   c) a means for temporarily holding an end of a tape measure, formed at one of said two ends.

2. The tool of claim 1 wherein the means for temporarily securing said elongate form to a workpiece comprises a mounting hole formed in said one of said two ends.

3. The tool of claim 1 wherein the means for temporarily holding an end of a tape measure comprises a raised member formed in said one of said two ends.

4. The tool of claim 1 wherein the plurality of holes formed in said center portion is spaced apart at measured intervals.

5. The tool of claim 4 wherein the plurality of holes form two columns in said center portion.

6. The tool of claim 5 wherein the plurality of holes is spaced apart at one-quarter inch intervals.

7. The tool of claim 5 further comprising indicator markings, formed on said center portion, indicating the spacing of said plurality of holes.

8. The tool of claim 1 further comprising at least one bubble level, installed in said center portion.

9. The tool of claim 8 further comprising a second bubble level formed in said center portion.

10. The tool of claim 9 wherein the bubble levels are orthogonally positioned on said center portion with respect to each other.

11. A circle making tool comprising:
   a) an elongate form having two ends and a center portion, said center portion having a plurality of holes formed therein;
   b) a first flange, formed at one of said two ends and extending outwardly therefrom, said first flange having a hole formed therein for receiving a means for pivoting said elongate form about a point;
   c) a second flange, formed at the other of said two ends and extending outwardly therefrom, said first flange having a hole formed therein for receiving a means for a means for making an underlying surface;
   c) a means for temporarily holding an end of a tape measure, formed at one of said two ends; and
   d) a means for temporarily supporting a tape of said tape measure, formed at the other of said two ends.

12. The tool of claim 11 wherein the plurality of holes formed in said center portion is spaced apart at measured intervals.

13. The tool of claim 12 wherein the plurality of holes form two columns in said center portion.

14. The tool of claim 12 wherein the plurality of holes is spaced apart at one-quarter inch intervals.

15. The tool of claim 12 further comprising indicator markings, formed on said center portion, indicating the spacing of said plurality of holes.

16. The tool of claim 11 further comprising at least one bubble level, installed in said center portion.

17. The tool of claim 16 further comprising a second bubble level formed in said center portion.

18. The tool of claim 17 wherein the bubble levels are orthogonally positioned on said center portion with respect to each other.

19. The tool of claim 11 wherein means for pivoting said elongate form about a point comprises a nail.

* * * * *